Sept. 3, 1963   F. J. LUKETA   3,102,356
LINES FOR TRAWL NETS
Filed Oct. 20, 1961   4 Sheets-Sheet 1
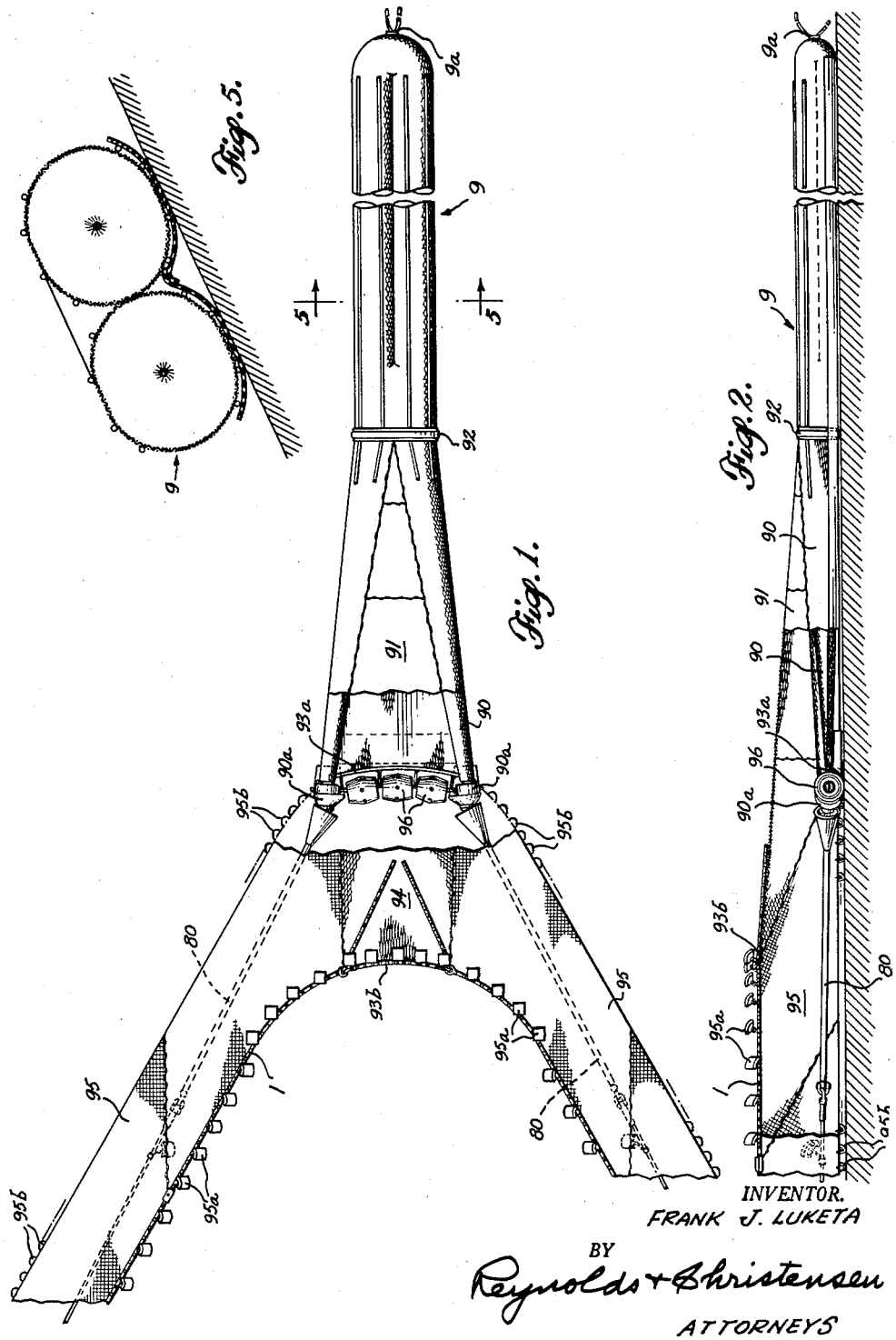
INVENTOR.
FRANK J. LUKETA
BY
Reynolds + Christensen
ATTORNEYS

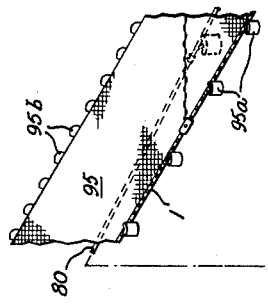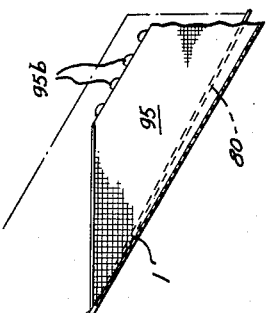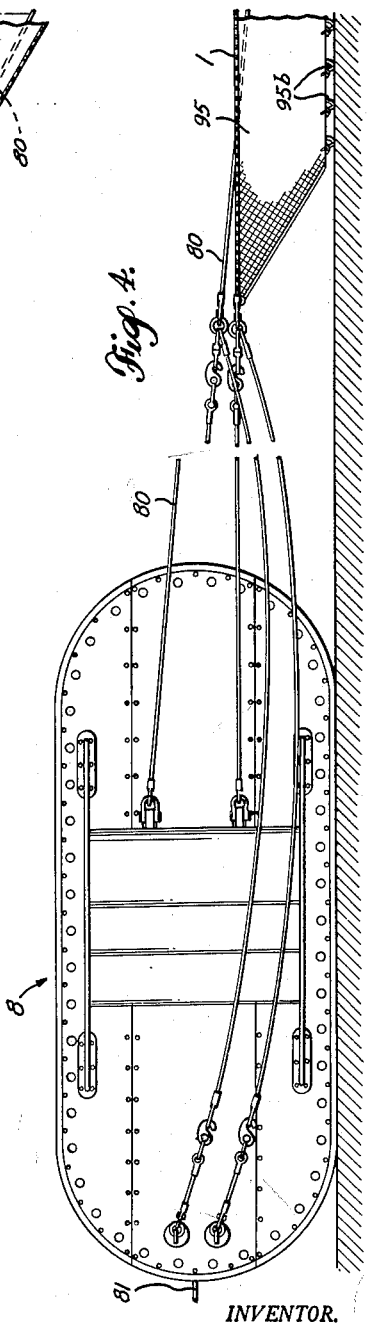

Sept. 3, 1963    F. J. LUKETA    3,102,356
LINES FOR TRAWL NETS
Filed Oct. 20, 1961    4 Sheets-Sheet 3
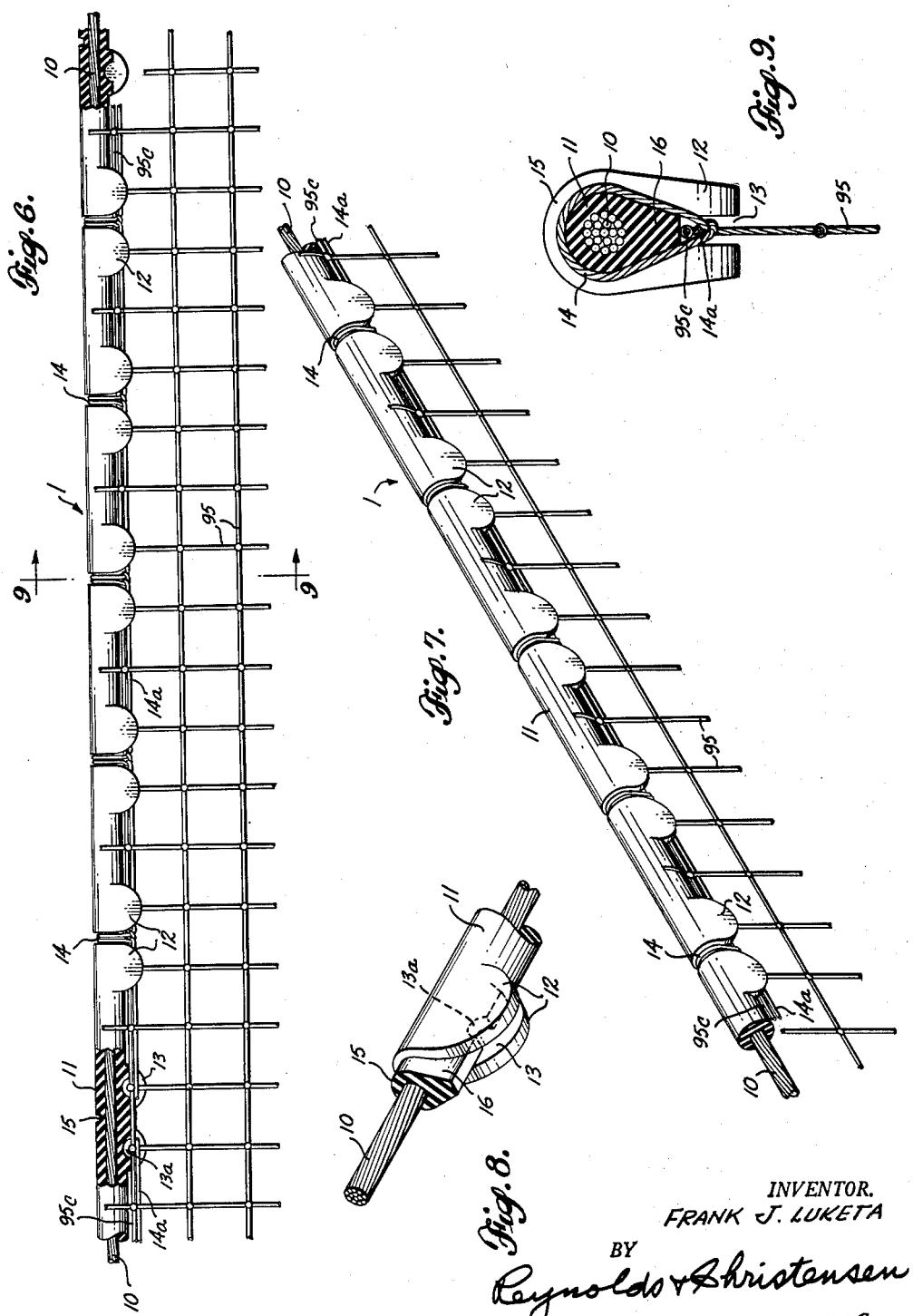
INVENTOR.
FRANK J. LUKETA
BY
Reynolds + Christensen
ATTORNEYS

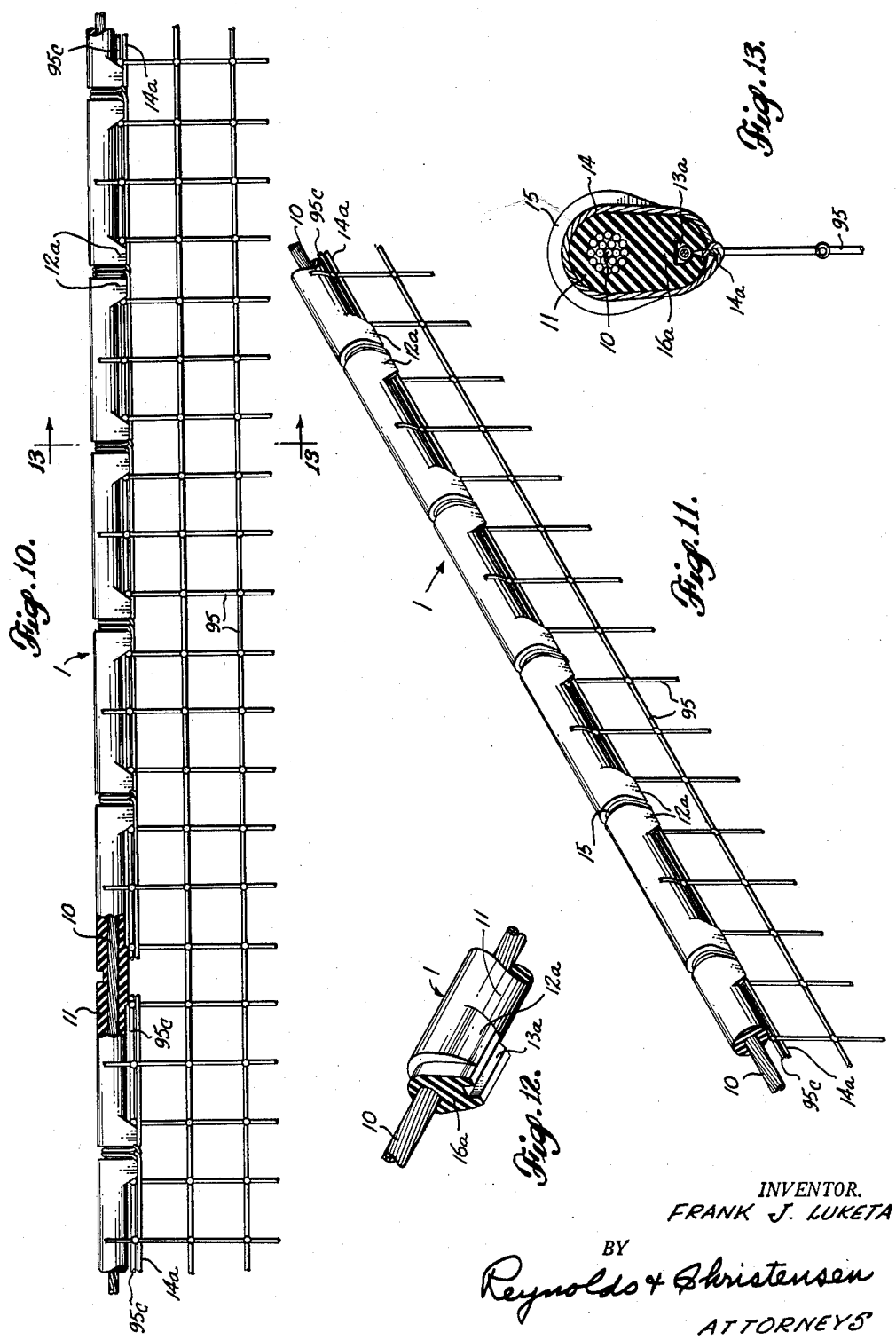

United States Patent Office 3,102,356
Patented Sept. 3, 1963

3,102,356
LINES FOR TRAWL NETS
Frank J. Luketa, 5567 Greenwood Ave., Seattle, Wash.
Filed Oct. 20, 1961, Ser. No. 146,537
7 Claims. (Cl. 43—9)

In a companion application entitled "Lines for Trawl Nets," Case A, Serial No. 154,383, filed October 20, 1961, I have disclosed a line construction which protects the cable that is the core of such a line against wear, and which by its construction is so aligned with the edge bar of the net panel to which it is secured, that torsional forces which might tend to enwrap the line within the net, and so chafe or distort the netting, are avoided. A second companion application entitled "Lines for Trawl Nets," Case C, Serial No. 149,007, filed October 31, 1961, and now issued as U.S. Patent No. 3,076,281, granted February 5, 1963, discloses further constructions to the same ends. In Case A the line construction is shown in association with the wings of a standard trawl net, which wings are of rather short length and large twine size.

The constructions mentioned are effective, and are quite suitable for use in conjunction with standard trawl nets, for in the latter some slight added bulk and resultant drag from the line is of minor consequence. Standard trawl nets transmit most of the drag through the meshes of the wings, hence these meshes must be of heavy twine, and the meshes are closed down by the drag, and so each wing itself produces heavy drag by the resistance of the water to its forward progress, and the wings are necessarily kept short in length. Any added bulk of lines along the edges of the wings would increase the drag to such a small extent as to be negligible. In trawl nets which employ curtains of small twine size, and the meshes of which are not closed down, but remain widely open in use, because they bear none of the drag of the net, and in which in consequence the curtains in themselves produce but slight drag, the curtains can be of great length, and the bulk of the lines along one or both edges of the curtains, and the drag produced by such bulk, becomes a factor of much greater importance.

This invention provides a line including a cable and a protective casing for the same which is of minimum frontal area, while still affording ample protection to the cable, and having the ability to maintain the cable properly aligned with the netting panel or panels. It is therefore well suited for use with nets which the use long curtains, and require minimization of drag, and is shown herein in conjunction with such a curtain, although it is equally well suited for use with the wings of a standard net, and would be so used if it is important to avoid the extra frontal area and drag of the lines of the other constructions.

Frontal area is kept to a minimum in the constructions shown herein by employing a protective casing for the cable of minimum diameter consistent with protection against wear, and at the same time alignment of the cable along the edge bar of the netting—which is a factor in avoiding torsional forces—is afforded by outstanding pairs of ears at intervals along the casing. Although these ears do increase the frontal area somewhat, they still are required to span and submerge ties adequately whereby the line is secured to and aligned with the netting. These ears are of minimum bulk consistent with their purposes.

The above outlines the principal purposes of this invention. Two specifically different forms of line are shown herein, and it is an object to enwrap the edge bar of the netting, and the line itself, by a tie, yet to submerge the tie in most or all of its extent from the possibility of wear while in use, and to locate the edge bar in assured alignment with the line, although leaving the edge bar free from positive engagement, or alternatively, it is an object to produce like results, although pinching and restraining the edge bar by elements forming part of the casing.

It is also an object to afford room to receive knots in the edge bar, in forms wherein such knots would tend to shorten the edge bar in relation to all parallel bars.

These and other objects will appear herein as this specification progresses.

FIGURE 1 is a plan view of a bottom trawl net and part of its curtains, of a type to which this invention particularly pertains, and FIGURE 2 is in part a side elevation and in part a longitudinal vertical section of the same.

FIGURE 3 is a plan view showing the forward extension of FIGURE 1, and the trawl door, and FIGURE 4 is an elevational view showing the same forward extension of FIGURE 2, also with the trawl door.

FIGURE 5 is a transverse sectional view at line 5—5 of FIGURE 1, through the cod end of such a net.

FIGURE 6 is an enlarged elevational view, partly in section, and FIGURE 7 is an isometric view of the upper edge portion of a net curtain or wing and a line secured thereto by the use of this invention, in one form.

FIGURE 8 is an isometric view of a detail of the cable and its casing at the point where the line is tied to the net's edge bar.

FIGURE 9 is a transverse sectional view at the line 9—9 of FIGURE 6.

FIGURE 10 is a view similar to FIGURE 6 of the net curtain edge and the line secured thereto, in a slightly modified or alternative form, and FIGURE 11 is an isometric view of the same, similar to FIGURE 7.

FIGURE 12 is an isometric view of a detail of the cable and its casing, at the point where the line is tied to the net's edge bar.

FIGURE 13 is a transverse sectional view at the line 13—13 of FIGURE 10.

The net which is shown in FIGURES 1 to 5 typifies that with which this invention is particularly concerned. It includes a cod end 9 pursed at 9a at its after end and opening forwardly to a funnel 91 through a rigid expander ring 92. The funnel terminates forwardly in a lower bosom 93a but an upper overhang 94 extends forwardly, and its forward edge defines the upper bosom 93b. Suspenders of mesh at 90 extend forwardly as part of the funnel from the expander ring 92, about which their rear ends are distributed, to a connector 90a at each side, where all the meshes at their forward ends are connected, whereby all the stress of dragging the cod end is taken, through the suspenders, by a sweep line 80 which extends forwardly, independently of net curtains 95, to a door 8. The upper edge of the curtain, and the upper bosom, are connected to a curtain line or float line 1, also connected at its forward ends to the door 8. The curtain line 1 and the upper bosom are supported well above the bottom, eight feet in one size of net, by floats 95a, and the lower edge of the curtains 95 are not secured to any line, but weights 95b distributed along their lower edge cause this edge to remain close to the bottom. The lower bosom is held down, yet supported above the bottom, by rolling bobbins 96. The entire net is dragged forwardly by towing warps 81 attached to the doors and extending to winch drums upon the trawler, neither of which is shown. Various other details are shown, but do not concern this invention, and further explanation thereof can be found in various of my copending applications or issued patents.

The curtain lines 1 are quite long being in one size as long as two thousand feet, or more, for each curtain. It is necessary that their bulk and weight be reduced as much as is possible, consistent with the load imposed by the drag of the curtain netting which is of light twine size, in order to reduce drag to a low value, and consistent with the protection to be afforded by the casing. The cable 10 which assumes the strain may be ⅜" or so in diameter, and should be protected by a sheath or casing 11 of about a minimum outside diameter of ¾", hence in a length of say one thousand feet such a line alone would present a minimum frontal area of over sixty square feet. Anything that can lessen this frontal area is desirable, yet there must still be provision for securing and aligning the line along the edge bar 95c of the curtain. Accordingly, in the form shown in FIGURES 6 to 9 the casing 11 is of circular cross section in general, but at the intervals in its length where the edge bar 95c is tied to it, paired ears 12 stand out and are spaced apart transversely of the line to define a slot 13 directed lengthwise of the line, and of sufficient depth and width to receive the edge bar 95c of the curtain. Two such pairs of ears 12 are provided, although one pair may suffice, at the respectively opposite sides of each tie 14, and the tie is received and submerged within a generally circumferential groove 15 intermediate the respective pairs of ears. In the form best shown in FIGURE 9 there is an enlargement or extension of the circular cross-sectional shape, shown at 16, in registry with the slot 13, and flattened within the slot. The edge bar 95c rests against the flattened end of the extension 16, intermediate the ears 12 of both pairs, where it is held by a tie 14. The tie may be part of a continuous seizing 14a which extends along the casing intermediate grooves 15, and the edge bar 95c also extends, in a straight line, closely along the casing 11. The netting will usually have knots along its edge bar so close to the several ties that such knots will lie in the slots between ears 12, and to accommodate these knots without crowding or bulging, or displacement of edge bar 95c from a straight line, a recess 13a is formed in the casing at the proper location. The casing would be preferably of a rubber-like material, resistant to wear, or a buoyant plastic such as polypropylene.

The form shown in FIGURES 10 to 13 differs from the form just described in two respects. First, the extension 16a includes parts of the ears 12a, and second the slot 13a lies in the extension 16a rather than between the paired ears. The edge bar 95c is received in the slot 13a, and the tie 14 which lies in the groove 15 encircles the extension 16a and squeezes inwardly the sides of the slot 13a to enclose or grip the edge bar and to retain the same within the slot.

While in either such form the ears 12 or 12a add somewhat to the frontal area, this much is needed to insure proper securement of the line to the net panel's edge, and to insure correct alignment.

If it becomes necessary to remove and repair or replace a given section of netting, it is only necessary to release the ties holding that section to the line, and when replacement is to be accomplished all that is required is the retying of these ties.

While the edge of the netting has been described as a bar of the mesh, the mesh may equally well be point-cut or taper-cut along the edge to be secured. Indeed, this invention may have even greater utility in such cases, since the spacing between grooves 15 is coordinated with the size of mesh squares, and there is little likelihood that the net panel's edge will be unduly stretched or contracted by incorrect engagement of meshes at successive grooves 15; it is most likely to be of uniform and intended length between ties.

The casing 1 may be made in short lengths, threaded successively upon the cable 10, as is shown in Case A, or it may be molded in place upon the cable, as also is shown in that case or in Case C. Since extra bulk would normally be required to permit it to be threaded onto the cable, it is preferred that the casing be molded upon the cable, and it has been so shown herein. At the same time, this is not an essential feature of this invention, and either type of mounting is to be understood as intended.

I claim as my invention:

1. A protective casing for a cable which in use extends lengthwise along an edge of a trawl net netting panel, such as has an edge bar, and for securing the cable in correct alignment along such edge, said casing including a sheath having portions of generally annular cross section and having a longitudinal tunnel of a size to receive the cable, external ears projecting at intervals along the length of said sheath, and arranged in pairs to lie at opposite sides of the netting panel, whereby each pair defines short slots aligned with the slots of others of said longitudinally-spaced pairs of ears to receive the edge of the netting, ties which in use encircle the sheath and the netting edge located in the slots between said paired ears, said sheath also having circumferential grooves in the vicinity of the pairs of ears, of a depth to receive and submerge said ties, and said sheath being of a wear-resistant material.

2. A protective casing for a cable as defined in claim 1, wherein the paired ears are located at each side of each groove, and said casing including a rib outstanding from the annular cross sectional portions of the sheath and extending longitudinally of the cable through each such groove, but terminating within the groove, and of a height less than the extent of projection of said ears.

3. A protective casing for a cable as defined in claim 2, wherein the ribs are formed with a recess located within each pair of ears, of a size to receive the knots inherent in the edge bar of the netting panel, the pairs of ears at opposite sides of each groove being spaced in accordance with the width of a mesh square of said netting panel.

4. A protective casing for a cable as defined in claim 1, wherein the paired ears extend lengthwise of the cable through each groove, and each groove indents the paired ears intermediate their ends, to a depth only such as to leave the slots intermediate the ears recessed therebetween, the sheathing being of resiliently deformable material, and a tie received in each groove and encircling the edge bar of the netting panel received in said slots, and urging the resilient groove-forming material of the sheething at each slot inwardly to closely embrace the netting bar received in said slot.

5. The combination with a netting panel of a trawl net, having an edge bar, of a line secured along said edge bar of said netting panel, said line including a cable and a protective casing of wear-resistant material enclosing said cable, said casing having pairs of elements outstanding from the casing and aligned with like elements spaced at intervals along its length, but the casing being otherwise of generally circular cross section, said pairs of outstanding elements cooperating to define slots extending lengthwise of the cable in the vicinity of the level of the circular portion, to receive the edge bar of the netting panel in correct alignment, and said outstanding elements having circumferential grooves intermediate their ends, and ties submerged within said grooves and encircling the said edge bar to secure the line to the netting panel.

6. The combination defined in claim 5, wherein the slots defined in the outstanding elements extend longitudinally throughout the circumferentially grooved portion, and the edge bar is received in such slots, the casing being of resiliently deformable material, and the ties urging the sides of the slots together to retain the edge bar, at the junction of the grooves and slots.

7. A line for use with trawl nets, and for securement along an edge bar of a net's mesh panel, said line comprising a cable and a surrounding casing of protective material, said casing being of generally circular cross section and formed with pairs of elements at intervals along its length, outstanding at one side of the casing, and located at opposite sides of a line directed longitudinally of the casing, to define slots for reception of said edge bar of the netting, and said casing being also formed with circumferential grooves located in the vicinity of such pairs of elements, and ties received in said grooves and encircling the edge bar received in said slots, to secure the netting to the line.

References Cited in the file of this patent

UNITED STATES PATENTS

| | | |
|---|---|---|
| 2,557,240 | Shigaki | June 19, 1951 |
| 2,894,366 | Leckie | July 14, 1959 |

FOREIGN PATENTS

| | | |
|---|---|---|
| 153,211 | Sweden | Jan. 24, 1956 |